March 7, 1933.                O. V. MARTIN                1,900,246
           RECOVERY OF SALTS AND OTHER PRODUCTS FROM OIL FIELD BRINES
                       Filed Aug. 14, 1930         3 Sheets-Sheet 3

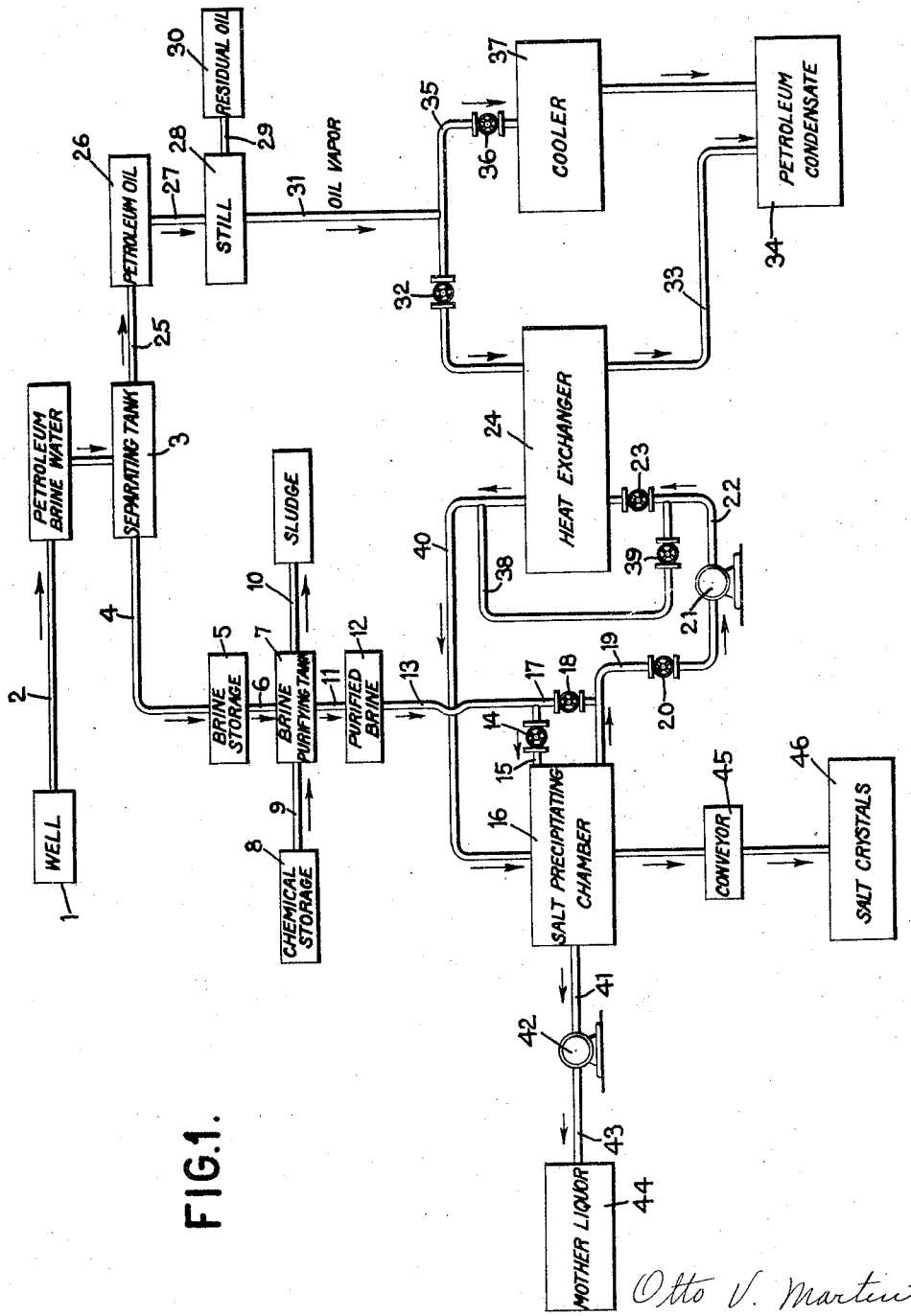

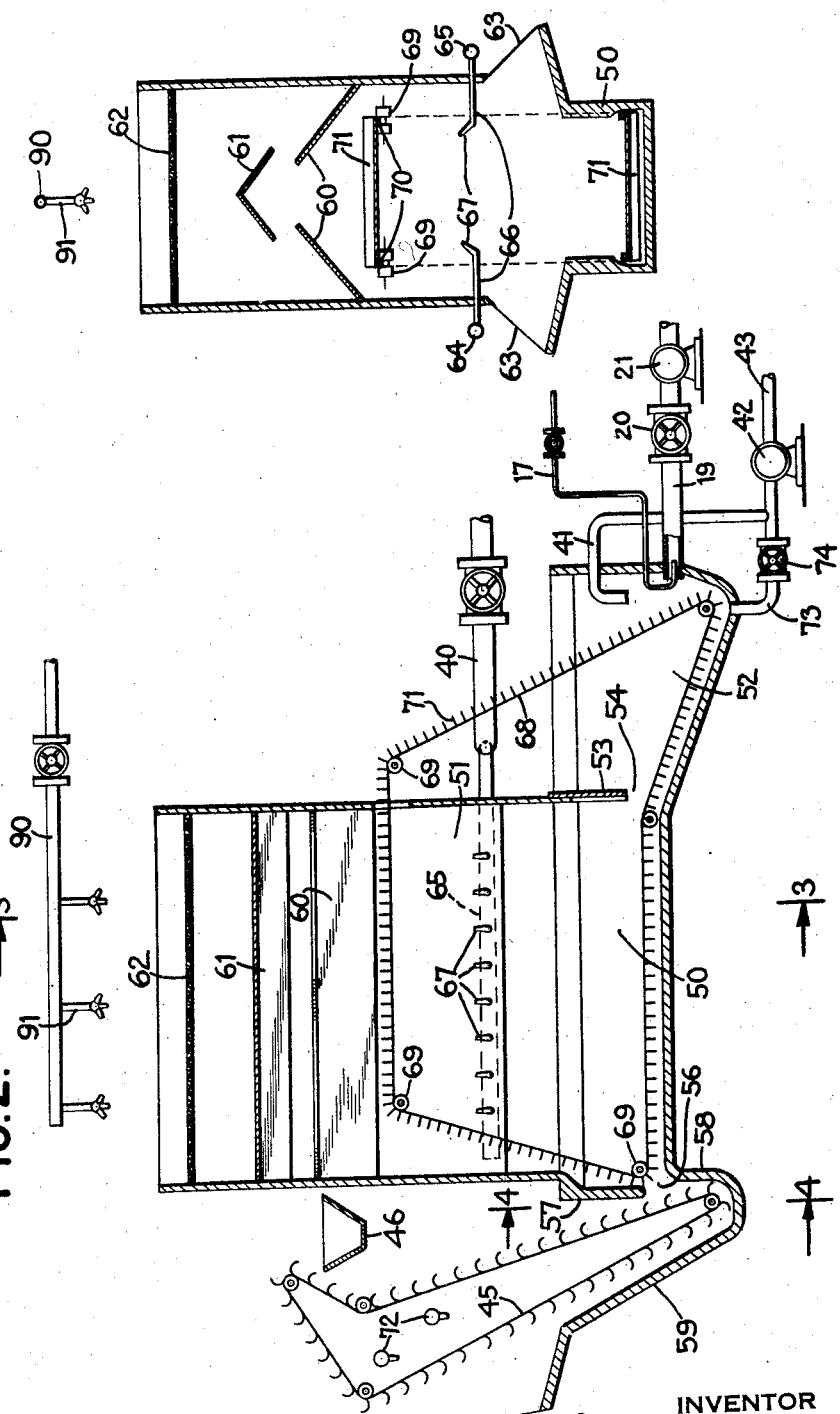

Otto V. Martin
INVENTOR

BY ATTORNEY
R. J. Dearborn

Patented Mar. 7, 1933

1,900,246

UNITED STATES PATENT OFFICE

OTTO V. MARTIN, OF SAND SPRINGS, OKLAHOMA, ASSIGNOR TO THE TEXACO SALT PRODUCTS COMPANY, OF NEW YORK, N. Y., A CORPORATION OF DELAWARE

RECOVERY OF SALTS AND OTHER PRODUCTS FROM OIL FIELD BRINES

Application filed August 14, 1930. Serial No. 475,270.

This invention relates to a method of and apparatus for treating salt solutions or brines, particularly brines obtained from oil fields, in conjunction with the refining of petroleum oil, for the recovery of salts or other products contained in the brine.

The invention broadly contemplates a process for recovering salts and other products from oil field brines, in conjunction with the refining of petroleum, wherein relatively cool brine, preferably after chemical treatment to remove undesired constituents, is brought into heat exchange relationship with the hot hydrocarbon fractions obtained during distillation or heat treatment of the petroleum to thereby cool the hydrocarbon fractions and supply the necessary heat for effecting concentration and super-saturation of the brine. The resulting super-saturated brine may then be directed into contact with precipitated salt particles or crystals whereby salt is deposited about the particles from the super-saturated solution to regulatably promote growth of the particles.

Ordinarily, oil field brine, of which there are usually large quantities more or less closely associated with petroleum as obtained from producing wells, is segregated from the petroleum as soon as removed from the well and conducted to reservoirs or streams as a waste material. Its disposition, in many instances however, has been fraught with considerable difficulty on account of the tendency to prohibitively pollute rivers or fresh water streams with the relatively large amounts of salt contained in the brine. Moreover the brine as obtained directly from the well is usually unsuitable as a cooling medium for cooling and condensing the hydrocarbon fractions produced during the refining of petroleum oil, as during the process of distillation or cracking, due to the corrosive effect which the brine ordinarily exerts upon iron or steel cooling and condensing equipment. On the other hand, the available and economical supply of water from other sources possessing little or no tendency to corrode iron or steel is usually inadequate.

However, as disclosed in my U. S. Patent No. 1,750,761, these corrosive tendencies of the brine may be inhibited by admixing therewith relatively small amounts of magnesium oxide or hydroxide or, as in the case of brine containing small quantities of magnesium chloride, treating it with lime to convert the chloride into magnesium hydroxide, thereby permitting the brine to be successfully employed as a cooling and condensing medium in the refining of hydrocarbon oils and the like, and thus avoiding the necessity of supplying cooling water from other and more expensive sources. At the same time sufficient heat may be absorbed by the brine in cooling the hydrocarbon fractions to facilitate spray concentration of the brine and subsequent precipitation of desired products dissolved therein without the necessity of supplying further heating.

My invention therefore comprises an improved process for the treatment of brine or salt solution in connection with the refining of petroleum in order to readily and economically recover salts, such as metallic chlorides, or other products from the brine some of which products or substances derived therefrom as for example bromine and chlorine, may subsequently be chemically combined with certain hydrocarbon fractions, such as ethylene, obtained during the refining of the petroleum to form desired synthetic chemical compounds, as for example, ethylene dibromide or ethylene di-chloride and the like.

My invention further contemplates an improved method of and apparatus for the production of inorganic salts, organic salts, or other materials which are either in solution or in suspension in a solution, comprising subjecting the solution to evaporation by spraying at temperatures below its normal boiling point to form super-saturated liquid which is commingled under regulatable conditions of intimacy of contact with previously precipitated salt particles serving as nuclei about which salt precipitates from the freshly formed super-saturated liquid to effect a desired degree of uniform growth of the salt crystals.

In my U. S. Patent No. 1,657,633 relating to a "Process for the production of salts from brines and solutions" I have described a process for the recovery of inorganic salts, organic compounds and the like, in solution, or finely divided materials in suspension in a liquid wherein the solution or liquid is concentrated by heating and subsequent spraying to bring about a condition of super-saturation of the solution and then maintaining a comparatively large body of concentrated solution in a substantially undisturbed condition of slow motion over a salt growing bed upon which salt crystals are deposited from the relatively quiescent liquid.

My present invention constitutes an improvement over the former in that I am able to control the growth of crystals of the salt precipitating from the solution to a degree hitherto impossible and to such extent that the production of exceedingly fine particles of the salt may be substantially entirely eliminated if desired.

The control of the growth of the salt crystals is largely dependent upon the degree of contact maintained between super-saturated liquid and precipitating salt particles. That is, where a concentrated solution from which crystals of salt are precipitating, remains in a substantially undisturbed condition, there may be a preponderance of fine particles or crystals precipitated and their rate of growth is relatively slow. This is due to the fact that a condition of equilibrium tends to prevail wherein that portion of the solution immediately adjacent to the precipitated material is in a state of less than super-saturation since salt has, of course, been precipitated therefrom. Since this portion of the liquid body is in a substantially quiescent condition, it prevents relatively more saturated portions or strata of the liquid body from making direct or intimate contact with the precipitated particles which latter might otherwise readily serve as nuclei about which additional salt could be precipitated. As a result the final product may comprise a preponderant proportion of undesired fine crystalline material.

I have found that control of the growth of the crystals may be effected by continuously bringing super-saturated liquid into intimate and direct contact with salt particles, already precipitated, so that the relatively fine particles are constantly commingled with super-saturated liquid from which salt is readily precipitated to build up on and adhere to the previously precipitated particles.

This may be accomplished by directing the super-saturated liquid, preferably as finely dispersed droplets, upon a slowly moving relatively shallow mass of precipitated salt which may, if desired, be maintained entirely out of contact with appreciable quantities of less than super-saturated liquid. Approximately similar conditions of intimate contact may also be achieved by directing sheet-like streams of super-saturated liquid onto and counter-currently over the slowly moving particle mass, over the greater portion of which a substantial body of less than super-saturated liquid may be maintained and in such a manner that the streams of super-saturated liquid sweep over the moving mass entraining the relatively fine particles from the mass subjecting them to tumbling or agitation in intimate contact with super-saturated liquid so that additional salt is immediately deposited from the super-saturated liquid about the fine particles until their size is increased to such an extent that they are no longer entrained by the flowing stream of solution and therefore remain on the moving mass or bed of salt to be eventually discharged from the system.

In order to more clearly understand the invention, reference will now be made to the figures of the accompanying drawings illustrating a flow diagram together with a preferred embodiment of apparatus particularly well adapted to carrying out my improved process and forming a part of the invention, in which:

Figure 1 is a flow diagram of the process.

Figure 2 is a diagrammatic view in elevation of a longitudinal section of a salt precipitating chamber and conveying system.

Figure 3 is a sectional view of the salt precipitating chamber taken along the line 3—3 of Figure 2.

Figure 4 is a sectional view taken along the line 4—4 of Figure 2 illustrating the salt discharge end of the precipitating chamber.

Figure 5 is a diagrammatic and elevational view of part of the system shown in Figure 1 showing the tank equipped with transverse baffles.

Referring to Figure 1 petroleum and salt water obtained from a well 1 either by natural flow or by conventional pumping means, not shown, is conducted through a pipe 2 to a storage tank 3 in which oil and brine may separate, on standing, from a state of more or less intimate admixture. The brine, from which it is desired to precipitate sodium chloride or common salt, may then be conducted through a pipe 4 to a brine storage tank 5 from which it is drawn through a pipe 6 to a treating tank or vessel 7 in which it may be contacted with suitable chemicals, such as lime, in order to precipitate certain substances as, for example, magnesium, iron, aluminum etc., which are usually present in the brine in the form of dissolved salts.

The lime or other chemical purifying agent, which is introduced from a tank 8 through a pipe 9 into the treating tank 7 reacts with the constituents which it is desired to remove from the brine at this point to form a sludge which may be withdrawn through a pipe 10 and disposed of in any suitable manner while the purified brine is preferably withdrawn through a pipe 11 to a storage tank 12 in which further settling out of impurities may occur.

From the tank 12, the purified brine may be conducted through a pipe 13 either to a branch pipe 15, having a valve 14, through which it is introduced directly to the salt precipitating chamber 16, which will be described later in the detailed discussion of the remaining figures of the drawings, or preferably to a branch pipe 17, having a valve 18, through which it is delivered to a pipe 19.

Liquid collecting in the bottom of the precipitating chamber 16 is drawn through the pipe 19, together with the fresh incoming brine from the pipe 18 by a circulating pump 21 and delivered through a pipe 22, having a valve 23, to a heater 24, preferably comprising an exchanger type of heater, wherein the liquid circulated by the pump 21 absorbs heat by cooling and/or condensing hydrocarbon fractions derived during the heat treatment of the petroleum from which the brine was separated in the tank 3.

The oil which is withdrawn from the tank 3 through a pipe 25 into a storage tank 26, may be delivered therefrom through a pipe 27 to a still 28 wherein it may be subjected to distillation or pyrolytic treatment according to conventional methods to form desired vapor and liquid fractions.

In the refining of petroleum certain fractions are produced, such as those of gasoline, of which advantage may be particularly taken as a heating medium for concentrating brine due to the fact that while their temperatures are usually insufficiently high to permit economically recovering their heat content by interchange with other oil refinery streams, they are sufficiently high and contain sufficient available heat to raise the brine to the necessary degree of temperature to effect concentration for the recovery of its contained salt by the method of my invention.

The liquid or residual oil fractions produced may be drawn off from the still 28 through a pipe 29 to suitable receiving means 30, while the vaporous fractions such as gasoline, are delivered through a pipe 31, having a valve 32, to the heater 24 from which the cooled material may then be withdrawn through a pipe 33 to a receiver 34. A by-pass pipe 35, having a valve 36, is preferably provided through which excess heating fluid may be led directly to other condensing or cooling means 37 and from thence to the receiver 34.

Similarly a by-pass 38 having a valve 39 is provided whereby any desired proportion of the circulating brine solution may be by-passed around the heater 24.

The provision of means whereby portions of the brine or heating medium may be by-passed around the heater facilitates close regulation of the temperature of the heated brine.

The brine heated to a temperature usually substantially lower than its normal boiling temperature is returned through a pipe 40 to the precipitating chamber 16 wherein it is subjected to evaporation by spraying and thereby transformed into a state of supersaturation from which the salt readily precipitates.

The excess mother liquor from which the desired salt crystals have been precipitated in the precipitating chamber 16 is drawn off through a pipe 41 by a pump 42 and delivered through a pipe 43 to a receiver or storage tank 44 from which it may be removed for further treatment, as for example, for the recovery of other salts or halogens such as bromine and iodine. The salt precipitated from the mother liquor is removed from the precipitating chamber by a conveyor 45 and delivered to a trough or hopper 46 from which it may be conveyed to classifiers or drying means.

Referring to Figures 2, 3, and 4, the precipitating chamber comprises a pond or tank 50 the larger and flat bottomed portion of which is surmounted by a shed or compartment 51.

The tank 50, preferably fabricated from metal, although other structural materials such as concrete may be employed, is of a rectangular or box-like shape having its floor depressed at one end to form a deeper portion or sump 52. A partition 53 extends across the tank between the shallow flat bottomed portion and the sump portion 52, and preferably forming at the bottom of the tank an adjustable weir-like opening 54 extending the full width of the tank.

A similar opening 56, is provided in the bottom of the end wall 57 of the tank affording communication between the tank and an elevator sump 58, provided with an outwardly sloping draining wall 59.

The compartment 51 mounted over the flat bottomed portion of the tank 50 comprises a spray tower consisting of four plain vertical walls having outwardly extending portions 63 at their bases preferably consisting of movable sections which may be set aside at will to form suitable openings through which air may enter at the base of the tower and rise upwards therethrough to finally escape through the top of the tower. Baffles 60 and 61 extend across the interior of the upper portion of the tower while a screen 62, preferably of copper having from 16 to 20 meshes to the inch, extends completely over the top of the tower.

The screen together with the baffles serve to knock back fine particles of salt solution which may be entrained by the air rising through the sprayed brine. The screen also exerts a certain amount of resistance to the flow of air therethrough thus tending to prevent sudden drafts or gusts of air through the system which would otherwise result in considerable quantities of salt being carried out of the system.

Fresh brine or water may be delivered to a spray manifold 90, having spray nozzles 91, so as to spray the upper surface of the screen in order to further facilitate precipitation of entrained matter from the air rising through the screen as well as wash salt particles deposited on the screen back into the system.

Spray manifolds 64 and 65 communicating with the pipe 40 extend longitudinally along the outside of the tower preferably just above the flared portion and have a plurality of lateral spray pipes 66 projecting through the side walls of the tower into the interior thereof and upon the ends of which suitable spray nozzles 67 may be secured in such position as to direct the spray upwards and outwards toward the middle portion of the tower away from the nozzles.

An endless drag conveyor 68 supported on rollers 69 and of the same width as the tank is adapted to drag entirely over the whole floor of the tank in order to move the mass of growing salt crystals thereover from the sump portion 52 to the outlet opening 56 in the shallow end of the tank discharging the crystals therethrough.

The drag, which may be supported in such a manner that sloping portions above the tank take up the slack due to their weight, preferably comprises two or more endless chains 70 to which are secured parallel transverse members or slats 71 spaced at suitable intervals throughout the length of the chains. The drag may be moved over the floor of the tank at the rate of from 1 to 5 linear feet per minute, for example, by suitable toothed gears, not shown, engaging with the chains and which gears may be rigidly mounted on a power driven shaft also not shown in the drawings.

As shown in Figure 3 the lower portion of the side-walls of the tank 50 may be recessed to form channels into which the ends of the moving slats 71 may be projected for the purpose of avoiding or minimizing deposition of substantial amounts of solid matter at the extreme edges of the drag.

In the practice of the invention, salt-containing solution or brine liquid is continuously drawn off through the pipe 19 from the sump portion 52 of the tank 50 together with fresh make-up charge from the pipe 17 by the pump 21 and delivered to the heater 24 wherein it may be heated to any desired temperature, but usually ranging between the temperature corresponding to the prevailing dew point of the air entering the tower and about 200° F., and then returned through the pipe 40 to the spray manifolds 64 and 65.

The heated solution is forced through the spray nozzles 67 so as to transform it into a mist or finely dispersed state throughout the interior of the tower 51. In this way evaporation of water occurs from the dispersed solution at relatively low temperature into the atmosphere within the tower comprising relatively unsaturated air entering at the bottom of the tower below the sprays and passing upwards through the tower to eventually escape in a substantially saturated condition through the screened opening at the top of the tower and thereby leaving the dispersed particles or droplets of solution in a highly super-saturated condition.

Where the temperature of the air entering the tower may be near its dew point the solution may be heated to a higher temperature as disclosed in my U. S. Patent No. 1,657,633 so that the resulting spray, as it comes into intimate contact with the atmosphere within the tower, heats it, keeping it above its dew point and thereby effecting the necessary evaporation of moisture from the solution into the atmosphere. On the other hand, the air may be conditioned as by refrigerating in order to reduce its degree of saturation prior to entering the spray tower.

The finely dispersed super-saturated particles of solution falling from the tower are preferably spattered over or projected towards the floor of the shallow portion of the tank over which the drag 68 is slowly passing and moving with it a continuous thinly disposed mass of particles or crystals precipitated out of the solution. Salt is precipitated from the super-saturated droplets or finely dispersed material falling upon the slowly moving crystal mass and the resulting less than super-saturated liquid droplets from which salt has precipitated, coalesce to form small bodies of liquid which trickle through the crystal growing bed onto the floor of the tank which may slope slightly towards the sump, and from there flow into the sump portion 52.

Thus as the mass of precipitated material is moved forward it is constantly spattered or contacted with super-saturated droplets of solution from which fresh salt readily precipitates out onto the particle mass, the individual particles of which serve as nuclei about which the freshly precipitating salt material adheres and builds up on resulting in a rapid and substantial degree of crystal growth.

The fully developed crystal mass is discharged through the opening 56 into the elevator sump 58 where it is picked up by the bucket elevator 45 the buckets of which are preferably perforated.

A spray of washing liquid preferably comprising a portion of the brine charge to the system, which may have been previously saturated with the final salt product, is directed through spray nozzles 72 against the salt crystals in the rising buckets in order to wash out entrained droplets of mother liquor. This washing liquid flows over the crystals, through the perforations in the buckets and gravitates into the tank 50 to there eventually commingle with the brine solution which is being drawn off, heated and returned through the spraying system.

The washed salt crystals are then delivered by the elevator 45 to a trough or hopper 46 through which they may be sluiced by a circulating saturated salt solution to a hopper or other receiving means for classifying, drying or further processing.

It will be seen that by the foregoing procedure the growth of the crystals is effected while in constant contact with super-saturated liquid dispersed in droplets or in a finely divided state, and, if desired, in the substantial absence of appreciable amounts of less than super-saturated liquid, which condition favors the maximum growth of the salt particles or crystals.

It may be desirable, however, to vary the growth of the crystals and this may be accomplished by maintaining liquid over the crystal bed to any desired or suitable depth so that either greater or less direct contact is made between the particle mass and freshly introduced super-saturated liquid. That is, when a substantial body of relatively undisturbed liquid is maintained over the crystal mass such liquid is for the most part, if not entirely, in a state of less than super-saturation since salt is being, or has already been, precipitated therefrom. The greater the depth of this intervening body of liquid the less direct and less intimate the contact between super-saturated liquid falling from the spray region onto the surface of this liquid body and the growing crystals submerged beneath the liquid body. With less intimate contact prevailing there-between the rate of crystal growth is relatively slower and substantial quantities of finer salt particles are produced, while under conditions of maximum direct contact between super-saturated liquid, preferably while in a finely dispersed state, the rate of crystal growth is relatively more rapid and the production of fine grades of precipitated salt may be substantially avoided.

The depth of this liquid body to be maintained in the tank 50 may be controlled by partially closing or opening the valve 20 in the suction pipe 19 or by regulating the pump 21 or also by the rate at which the excess mother liquor is drawn from the system either through the pipe 41 or through a branch pipe 73, having a valve 74, by the pump 42.

A further means of regulating the crystal growth comprises varying the temperature to which the circulating solution may be heated prior to spraying, since I have found that by spraying at higher temperature the resulting dispersed solution possesses a correspondingly greater degree of super-saturation which favors the production of larger salt particles.

An alternative means of realizing direct contact between the growing crystals and super-saturated liquid is illustrated in Figure 5 wherein the salt growing bed may be submerged at a substantial depth in a body of solution or liquid while the super-saturated portion of the liquid existing at the surface of the liquid body is directed, by suitable baffling, into intimate contact with the growing crystals.

A plurality of sets of three transverse vertical baffles 81, 82, and 83 extend across the tank at suitable intervals dividing the tank into a plurality of compartments. The baffles are preferably adjustably secured to the side-walls of the tank so that the clearance between the lower edge of each baffle and the moving salt bed may be increased or decreased at will while the space between the adjacent baffles in each set of three baffles may also be varied.

The relative position of the baffles in each set may be adjusted so that the upper or surface layer and therefore freshly introduced and substantially super-saturated portion of the solution in a preceding compartment flows over the upper edge of the baffle 81 into the space between baffles 81 and 82 through which it flows downwardly and by which means it is directed against and into contact with the particles or crystals disposed on the salt growing bed. This downflowing stream of liquid agitates the crystals and fine particles on the salt growing bed, sweeping the finer particles out of the bed and entraining them as it rises through the space between the baffles 82 and 83 wherein the fine particles are subjected to a large amount of tumbling in intimate admixture with the super-saturated solution, so that the salt which precipitates from the super-saturated solution builds up on and adheres to the fine particles until their size is increased to such an extent that they eventually sink through the ascending stream of liquid and fall onto the moving salt growing bed, remaining thereon and passing under the remaining sets of baffles to be finally discharged into the sump 58. The solution after rising through the space between the baffles 82 and 83 flows over the upper edge of the baffle 83 into the succeeding tank compartment wherein the cycle is repeated with fresh super-saturated liquid at succeeding sets of baffles.

The degree of turbulence existing between the baffles 82 and 83, for example, can be regulated by adjusting the distance between these baffles and by which means the intimacy of contact between fine salt material and the super-saturated solution may be regulated.

The extent to which the crystals and particles on the salt-growing bed are subjected to the sweeping action of the super-saturated solution may be regulated by varying the amount of clearance maintained between the lower edge of the baffle 82 and the bed. That is, with decreasing clearance the velocity of fluid through the opening increases thereby tending to sweep out and entrain more and larger sized particles from the mass on the bed up into the space between the baffles 82 and 83.

The fresh salt solution or makeup other than that entering the system as washing fluid for the final product as already mentioned, is introduced through the pipe 17 which preferably delivers the brine just within the open end of the suction pipe 19 extended through the end of the tank into the saturated solution collecting therein. Introduction of the dilute fresh charge at this point serves to dilute the substantially saturated circulating solution as it enters the circulating pipe 19 in order to avoid deposition of solids and their encrustation on the interior of this pipe. The mixture of fresh charge and circulating solution is conducted to the heater 24 in which it may absorb heat from either vapor or liquid hydrocarbon fractions as already described.

My improved process is well adapted to the recovery of a number of materials from their solutions and is particularly well suited to the production of that class of salts which may be referred to as hydrates and which comprise such products as the hydrates of sodium sulfate or of other salts such as those of magnesium, as for example Epsom salts. As is well known, substances such as magnesium or sodium sulphate, for example, may exist in one or more different hydrated forms, each form comprising salt crystals having a definite number of molecules of water associated therewith as water of crystallization.

In the usual methods of preparing crystals of hydrates, the salt solution is concentrated by boiling until such a degree of concentration is reached that the solution is super-saturated when cooled, whereupon precipitation of the hydrates occurs, those hydrates having the least number of molecules of water of crystallization tending to form and precipitate first, the remaining hydrates of the series being successively thrown down as the solution progressively cools.

When the particularly desired hydrate form is that having the largest amount of water of crystallization the concentrated hot solution is allowed to cool, whereupon a temperature is soon reached at which the hydrate containing the least amount of water may be formed and partially thrown out of solution in the form of crystals, due to a state of super-saturation still prevailing with gradual cooling of the solution. As the temperature drops further a point is reached at which the next hydrate in the series containing the next quantity of water will be formed, and that portion of the first hydrate which may still have remained in solution will be decomposed. Crystals of this second hydrate may then be precipitated from the solution due to the continuing state of super-saturation, though some of this second hydrate will remain in solution. Finally a temperature is eventually reached at which the particularly desired hydrate forms and at which any other hydrates remaining in the solution decompose to form this desired hydrate, crystals of which precipitate from the solution due to further cooling and consequent super-saturation of the solution, since as is set forth in the literature, three hydrates of the same salt cannot co-exist in solution and moreover two hydrates of the salt can only co-exist in solution at the transition point between the two hydrates.

Due to this formation of hydrates other than the one desired, as the solution is rapidly cooled down, it is necessary to remove the precipitated undesired hydrates at some point in the system removed from that at which the desired hydrates is to be precipitated. This obviously necessitates increased handling during the crystallization process and makes it necessary to later redissolve the undesired hydrates which have been precipitated and return them along with fresh solution or make-up charge to the concentrating kettles to again undergo treatment.

Relatively high temperatures must be employed and a much lower yield of desired crystals is realized by this method of precipitation per unit of heat absorbed than would result if a process were used where only the desired hydrate is formed.

On the other hand, when using the spray method of concentrating solutions the temperature of the solution may be raised only just high enough so that upon spraying a state of super-saturation is attained at that temperature at which the desired hydrate only will be precipitated and without reaching a temperature at which other hydrates than the desired hydrate coud be formed.

For example, when spraying a solution of sodium sulfate to form super-saturated liquid at about 90° F. crystals of anhydrous salt ($Na_2SO_4$) may be precipitated while by spraying to form super-saturated liquid at about 32° F. crystals of deca-hydrate ($Na_2SO_4.10H_2O$) would be precipitated.

Thus by employing the spray method of concentrating salt solutions to produce desired hydrated forms of the salts I am able to selectively effect super-saturation of the solution at a temperature less than the boiling temperature of the solution and at which temperature precipitation of a desired hydrate is brought about to the substantial exclusion of the precipitation of other hydrate forms.

It will be seen, therefore, that by the spray method of concentrating a greater yield of crystals is obtained with a minimum amount of heating while the production of the crystals of the undesired hydrate forms is substantially entirely avoided.

Obviously many modifications and variations of the invention, as hereinbefore set forth, may be made without departing from the spirit and scope thereof, and therefore only such limitations should be imposed as are indicated in the appended claims.

I claim:

1. In the herein described process of preparing salts from solutions the steps which comprise directing super-saturated solution in a finely dispersed state onto a salt growing bed over which salt crystals are thinly disposed, and slowly and continuously moving the salt crystals over the bed whereby the crystals are brought into intimate contact with the finely dispersed super-saturated solution to precipitate salt therefrom and effect growth of the crystals.

2. In the herein described process of preparing salts from solutions, the steps which comprise directing super-saturated solution in a finely dispersed state onto a salt growing bed over which salt crystals are thinly disposed in the substantial absence of appreciable amounts of liquid, and slowly and continuously moving the salt crystals over the bed whereby the crystals are brought into intimate contact with the finely dispersed super-saturated solution to precipitate salt therefrom and effect growth of the crystals.

3. In the herein described process of preparing salts from solutions the steps which comprise directing super-saturated solution upon the surface of a body of solution from which salt is precipitating onto a salt growing bed submerged within the body of liquid and bringing super-saturated liquid from the surface of the liquid body into direct contact with the crystals deposited on the salt growing bed in order to precipitate salt from the super-saturated liquid directly upon the crystals to effect their growth.

4. In the herein described process of preparing salts from solutions the steps which comprise directing super-saturated solution upon the surface of a body of solution from which salt is precipitating onto a salt growing bed submerged within the body of liquid and deflecting, in successive stages, super-saturated liquid collecting on the surface of the liquid body into direct contact with the crystals deposited on the salt growing bed in order to precipitate salt directly from the super-saturated liquid upon the crystals to effect their growth.

5. In the herein described process of preparing salts from solutions the steps which comprise directing super-saturated solution in finely dispersed form upon the surface of a body of solution from which salt is precipitating onto a salt growing bed submerged within the body of liquid, continuously moving the precipitated salt over the bed towards the point of salt discharge therefrom and continuously deflecting, in successive stages, super-saturated liquid collecting on the surface of the liquid body counter-currently to and into direct contact with the mass of crystals on the moving salt growing bed whereby the relatively fine particles are swept out of the mass of crystals disposed over the salt growing bed and commingled with the super-saturated liquid to form nuclei therein about which salt precipitated from the super-saturated solution is deposited thereby effecting uniform growth of the salt crystals.

6. The process of recovering salts from petroleum oil field brines in conjunction with the refining of petroleum which comprises treating the brine with chemicals to remove undesired constituents and inhibit its corrosive effect upon iron or steel, flowing the treated brine in indirect contact with hot hydrocarbon fractions produced during the refining of the petroleum to thereby heat the brine and cool the hydrocarbon fractions, spray concentrating the heated brine to convert it to a finely dispersed super-saturated condition, precipitating salt therefrom on to a salt growing bed and continuously moving the precipitated salt over the bed whereby super-saturated brine is brought into intimate contact with the moving mass of precipitated salt particles to precipitate salt from the solution about the particles to produce a product consisting substantially of relatively large salt crystals.

7. The process of recovering salts from petroleum oil field brines in conjunction with the refining of petroleum which comprises treating the brine with chemicals to remove undesired constituents, flowing the treated brine, in indirect contact with hot hydrocarbon fractions produced during the refining of the pertoleum to thereby heat the brine and cool the hydrocarbon fractions, spray concentrating the heated brine to convert it to a super-saturated solution directing the super-saturated solution upon the surface of a body of liquid from which salt is precipitating onto a moving salt growing bed submerged within the body of liquid, continuously moving the precipitated salt over the bed and deflecting, in successive stages super-saturated solution accumulating on the surface of the liquid body into direct contact with crystals moving over the salt growing bed in order to precipitate salt directly from the super-saturated solution upon the crystals to effect their growth.

8. The process of recovering salts from petroleum oil field brines in conjunction with the refining of petroleum which comprises treating the brine with chemicals to remove undesired constituents, flowing the treated brine, together with brine previously cycled through the system and from which salt has been precipitated, in indirect contact with hot hydrocarbon fractions produced during the refining of the petroleum to thereby heat the brine and cool the hydrocarbon fractions, spray concentrating the heated brine to convert it to a finely dispersed super-saturated solution directing the super-saturated solution upon the surface of a body of liquid from which salt is precipitating onto a salt growing bed submerged within the body of liquid, continuously moving the precipitated salt over the bed, and continuously deflecting, in successive stages, super-saturated solution accumulating on the surface of the liquid body countercurrently to and in direct contact with the mass of crystals moving over the salt growing bed whereby the relatively fine particles are commingled with the super-saturated solution to form nuclei about which salt is precipitated from the super-saturated solution to effect growth of the fine crystals which are returned to the bed thereby producing salt crystals of uniform size.

9. The process of preparing salt, having one or more hydrate forms, from a solution in the form of crystals of one of the hydrates, which comprises heating the solution at a temperature below its normal boiling point, subjecting the heated solution to spraying while exposed to the air to form a super-saturated solution at a temperature at which the undesired hydrate forms do not exist and from which crystals of the desired hydrate are precipitated disposing the precipitated crystals over a salt-growing bed, and continuously moving the crystals over the bed while exposed to the dispersed supersaturated solution.

10. Apparatus for recovering salts from solutions comprising a spray tower in which a solution after heating is subjected to spray evaporation to form a super-saturated solution, a tank in communication with the tower adapted to collect the sprayed liquid and in which salt precipitates from the solution, a drag for maintaining the precipitated salt in a thinly disposed mass of crystals moving towards the point of crystal discharge from the tank, adjustable baffles spaced at intervals throughout the length of the tank for directing rapidly flowing currents of solution over the mass to sweep out relatively fine crystals and subject them to continued contact with freshly sprayed supersaturated solution, means for removing the crystals from the tank, a pipe leading from the tank through which liquid collecting in the tank and from which salt has been precipitated is withdrawn, means for introducing fresh solution to the inlet of the pipe to dilute the liquid and prevent deposition of solid matter therein, a heater in communication with said pipe for heating the diluted liquid, means for returning the heated liquid to the spray tower for further spraying and a draw-off through which excess liquid collected in the tank is removed.

11. Apparatus for recovering salts from solutions comprising a spray tower in which a solution after heating is exposed to relatively unsaturated gas to remove water and form a super-saturated solution, baffling means in the upper portion of said tower, a screen disposed above said baffles, nozzles positioned above said screen adapted to spray liquid thereover to knock back entrained salt containing liquid particles from the air rising therethrough, a tank in communication with the tower adapted to collect the sprayed liquid and in which salt precipitates from the solution, means for maintaining the precipitated salt in a thinly disposed mass of crystals moving towards the point of crystal discharge from the tank, baffling means for directing rapidly flowing currents of solution over the mass to sweep out relatively fine crystals and subject them to continued contact with freshly sprayed supersaturated solution, means for removing the crystals from the tank, a pipe leading from the tank through which liquid collecting in the tank and from which salt has been precipitated is withdrawn, means for introducing fresh solution to the inlet of the pipe to dilute the liquid and prevent deposition of solid matter therein, a heater in communication with said pipe for heating the diluted liquid, means for returning the heated liquid to the spray tower for further spraying and a draw-off through which excess liquid collecting in the tank is removed.

12. The process of preparing salt, having one or more hydrate forms, from a solution in the form of crystals of one of the hydrates, which comprises heating the solution at a temperature below its normal boiling point, subjecting the heated solution to spraying while exposed to the air to form a supersaturated solution at a temperature at which the undesired hydrate forms do not exist and from which crystals of the desired hydrate are precipitated, directing the sprayed supersaturated solution upon the surface of a body of solution from which salt is precipitating on to a salt-growing bed submerged within the body of solution, continuously moving the precipitated salt over the bed and deflecting, in successive stages, supersaturated liquid collecting on the surface of the body of the solution countercurrently to and into direct contact with the crystals disposed on the salt-growing bed in order to precipitate salt directly from the supersaturated liquid upon the crystals to effect their growth.

13. In the process of preparing salt of uniform crystal size from solutions containing the salt, the steps comprising continuously forming a supersaturated solution in a sprayed condition, directing the sprayed solution over the surface of a body of solution from which salt is precipitating and forming a mass of crystals of non-uniform size, slowly and continuously moving the precipitated mass of crystals countercurrently through the body of solution, and directing rapidly flowing currents of solution over the mass to sweep out relatively fine crystals and subject them to continued contact with freshly sprayed supersaturated solution and thereby increase their size.

14. In the process of recovering salt from oil field brines and the like, the steps comprising treating the brine with lime to remove impurities and render it substantially non-corrosive to iron and steel, heating the brine to a temperature below its normal boiling point, subjecting the heated brine to spraying while exposed to the air to form a supersaturated solution, directing the sprayed solution over the surface of a body of solution from which salt is precipitating and forming a mass of crystals of non-uniform size, slowly and continuously moving the precipitated mass of crystals through the body of solution, and directing rapidly flowing currents of solution over the mass to sweep out relatively fine crystals and subject them to continued contact with freshly sprayed supersaturated solution and thereby increase their size.

In witness whereof I have hereunto set my hand this 22 day of July, 1930.

OTTO V. MARTIN.

CERTIFICATE OF CORRECTION.

Patent No. 1,900,246.　　　　　　　　　　　　　　　　March 7, 1933.

OTTO V. MARTIN.

It is hereby certified that error appears in the printed specification of the above numbered patent requiring correction as follows: Page 7, line 117, claim 7, for "pertoleum" read "petroleum"; line 123, strike out the word "moving"; and line 126, after "stages" insert a comma; and that the said Letters Patent should be read with these corrections therein that the same may conform to the record of the case in the Patent Office.

Signed and sealed this 16th day of May, A. D. 1933.

(Seal)　　　　　　　　　　　　　　　　M. J. Moore.
　　　　　　　　　　　　　　　Acting Commissioner of Patents.